US008949476B2

(12) United States Patent
Berionne et al.

(10) Patent No.: US 8,949,476 B2
(45) Date of Patent: Feb. 3, 2015

(54) METHOD AND APPARATUS FOR PROVIDING AN INTERFACE BETWEEN A UICC AND A PROCESSOR IN AN ACCESS TERMINAL THAT SUPPORTS ASYNCHRONOUS COMMAND PROCESSING BY THE UICC

(71) Applicant: QUALCOMM Incorporated, San Diego, CA (US)

(72) Inventors: Michele Berionne, San Diego, CA (US); Jose Alfredo Ruvalcaba, Winchester, CA (US); Younghwan Kang, San Diego, CA (US); Nicholas Matthias Beckmann, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/031,878

(22) Filed: Sep. 19, 2013

(65) Prior Publication Data
US 2014/0289500 A1    Sep. 25, 2014

Related U.S. Application Data

(60) Provisional application No. 61/803,194, filed on Mar. 19, 2013.

(51) Int. Cl.
*G06F 3/00*     (2006.01)
*G06F 5/00*     (2006.01)
*G06F 9/30*     (2006.01)

(52) U.S. Cl.
CPC .................................. *G06F 9/30003* (2013.01)
USPC ................................................. 710/6; 710/58

(58) Field of Classification Search
None
See application file for complete search history.

(56) References Cited

U.S. PATENT DOCUMENTS

| 7,520,441 | B2 | 4/2009 | Cho |
| 7,886,311 | B2 | 2/2011 | Yao et al. |
| 2006/0085848 | A1 | 4/2006 | Aissi et al. |
| 2008/0092149 | A1 | 4/2008 | Rowhotham et al. |
| 2011/0227708 | A1 | 9/2011 | Takahashi |

FOREIGN PATENT DOCUMENTS

| CN | 201562293 U | 8/2010 |
| EP | 1523205 A2 | 4/2005 |
| WO | WO-2012/089332 A1 | 7/2012 |

OTHER PUBLICATIONS

International Search Report and Written Opinion—CT/US2013/060937—ISA/EPO—Feb. 3, 2014.

*Primary Examiner* — Kris Rhu
(74) *Attorney, Agent, or Firm* — Arent Fox LLP

(57) ABSTRACT

Techniques for providing an interface between a UICC and a processor, included in an access terminal, that supports asynchronous command processing by the UICC, are described. A first complex command, with a first processing time, may be received from the processor. An initial response to the first command, including a token, may be sent to the processor. The first command may be processed for the first processing time. At least one additional command, having a processing time shorter than the first processing time, may be received from the processor. Processing of the first command may be completed. Processing of a current one of the at least one additional command, which was being processed before, during, or after completion of the processing of the first command, may be completed. A response to the current one of the at least one additional command, including the token, may be sent to the processor.

20 Claims, 5 Drawing Sheets

METHOD AND APPARATUS FOR PROVIDING AN INTERFACE BETWEEN A UICC AND A PROCESSOR IN AN ACCESS TERMINAL THAT SUPPORTS ASYNCHRONOUS COMMAND PROCESSING BY THE UICC

CLAIM OF PRIORITY UNDER 35 U.S.C. §119

The present application for patent claims priority to Provisional Application No. 61/803,194 entitled "METHOD AND APPARATUS FOR SUPPORTING ASYNCHRONOUS COMMAND PROCESSING BY A UICC AT AN ACCESS TERMINAL" filed Mar. 19, 2013, and assigned to the assignee hereof and hereby expressly incorporated by reference herein.

BACKGROUND

1. Field

The present disclosure relates generally to wireless devices, and more particularly, to method and apparatus for providing an interface between a UICC and a processor in an access terminal that supports asynchronous command processing by the UICC.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth and transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple access terminals, such as, for example, mobile or wireless devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In many access terminals (AT), subscription information is stored in either a nonvolatile (NV) device memory or a removable Universal Interface Circuit Card (UICC) depending on the access technology to which the subscription information pertains. Currently, for example, in certain access terminals, when network service is available on a 1x-RTT/Data Optimized (DO) network technology, network subscription information is stored on and retrieved from the device NV memory. However, in these devices, when service is available on any other access technology—such as GSM, UMTS, or LTE—subscription information is stored on and retrieved from the UICC. The UICC also may be referred to as a smart card or a subscriber identity module or subscriber identification module (SIM) card.

Conventionally, cards, such as a UICC, were used in access terminals to provide network subscription information. However, UICC are now used to handle other tasks. For example, near field communications (NFC) is a set of standards for wireless devices, such as smart phones and the like, to establish radio communication with each other by touching the devices together or bringing the devices into close proximity (e.g., usually no more than a few centimeters). NFC allows wireless devices to perform contactless transactions, data exchange, and simplified setup of more complex communications, such as Wi-Fi. Common examples of NFC applications include applications related to banking and mobile payments. As the market pushes to use the UICC as a preferred Secure Element for such applications, certain issues may arise as between UICC processing of (traditional) telecommunications tasks and (newly-added) non-telecommunications tasks.

Telecommunications applications, which may be processed at a UICC within an access terminal, are time-sensitive and may need ready, and quick, access to the services on the UICC. In contrast, non-telecommunications applications, such as, for example, payment or banking applications, may be highly complex, cryptographic algorithms, which require extremely long times (e.g., even more than one minute) to process a single command.

The interface between the UICC and the terminal (specified in ETSI 102 221, which is publicly available) only allows a single command to be processed by the UICC at a time. As such, an access terminal needs to receive a response to a first command before it may send a second command. In order to process a command that takes a long time (e.g., a complex, non-telecommunications command), the UICC sends NULL bytes (as specified in ETSI 102 221) in order to inform the access terminal that it is still processing the command and to request the access terminal continue to wait for the response.

As a result of the UICC processing such complex, non-telecommunications commands that take a very long time to process, the UICC may essentially be blocked, or unavailable, to the access terminal for receiving, and processing, any additional commands until the non-telecommunications command is finished processing. Because of the time-sensitive nature of telecommunications-related commands, such unavailability of the UICC may result in a user being unable to initiate a voice call, send a text message, authenticate to a network, utilize high-level operating system (HLOS) applications (often referred to as "apps") or perform any number of other actions. This situation is untenable and would be unacceptable to a user of the wireless device.

As such, improvements in processing commands from an access terminal by a UICC are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for providing an interface between a UICC and a processor, included in an access terminal, that supports asynchronous command processing by the UICC is described. The method may include receiving a first command from the processor. The first command may be a complex command with a first processing time. The method may include sending an initial response to the first command to the processor. The initial response may include a token associated with the first command. The method may include processing the first command for the first processing time. The method may include receiving at least one additional command from the processor. Each of the at least one additional command may have a processing time shorter than the first processing time. The method may include completing processing of the first command. The method may include completing processing of a current one of the at least one additional command. The current one of the at least one additional command may be a command that is processing before, during, or after completion of the processing of the first command. The method may include sending a response to the current one of the at least one additional command to the processor. The response may include the token.

In an aspect, a computer program product for providing an interface between a UICC and a processor, included in an access terminal, that supports asynchronous command processing by the UICC is described. The computer program product may include a computer-readable medium comprising code. The code may cause a computer to receive a first command from the processor. The first command may be a complex command with a first processing time. The code may cause a computer to send an initial response to the first command to the processor. The initial response may include a token associated with the first command. The code may cause a computer to process the first command for the first processing time. The code may cause a computer to receive at least one additional command from the processor. Each of the at least one additional command may have a processing time shorter than the first processing time. The code may cause a computer to complete processing of the first command. The code may cause a computer to complete processing of a current one of the at least one additional command. The current one of the at least one additional command may be a command that is processing before, during, or after completion of the processing of the first command. The code may cause a computer to send a response to the current one of the at least one additional command to the processor. The response may include the token.

In an aspect, an apparatus for providing an interface between a UICC and a processor, included in an access terminal, that supports asynchronous command processing by the UICC, is described. The apparatus may include means for receiving a first command from the processor. The first command may be a complex command with a first processing time. The apparatus may include means for sending an initial response to the first command to the processor. The initial response may include a token associated with the first command. The apparatus may include means for processing the first command for the first processing time. The apparatus may include means for receiving at least one additional command from the processor. Each of the at least one additional command may have a processing time shorter than the first processing time. The apparatus may include means for completing processing of the first command. The apparatus may include means for completing processing of a current one of the at least one additional command. The current one of the at least one additional command may be a command that is processing before, during, or after completion of the processing of the first command. The apparatus may include means for sending a response to the current one of the at least one additional command to the processor. The response may include the token.

In an aspect, an apparatus for providing an interface between a UICC and a processor, included in an access terminal, that supports asynchronous command processing by the UICC, is described. The apparatus may include at least one memory in communication with at least a communications component, a data store, a user interface, and a processor. The apparatus may include a UICC. The UICC may include a command reception module configured to receive a first command from the processor via the communications component. The first command may be a complex command with a first processing time. The UICC may include an initial response module configured to send an initial response to the first command to the processor via the communications component. The initial response may include a token associated with the first command. The UICC may include a command processing module configured to process the first command for the first processing time. The command reception module also may be configured to receive at least one additional command from the processor via the communications component. Each of the at least one additional command may have a processing time shorter than the first processing time. The command processing module also may be configured to complete processing of the first command, complete processing of a current one of the at least one additional command, and send a response to the current one of the at least one additional command to the processor via the communications component. The current one of the at least one additional command may be a command that is processing before, during, or after completion of the processing of the first command. The response may include the token.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

A new behavior of a UICC included within an access terminal is introduced to allow additional commands to be executed by the UICC while a first command is in progress on a separate logical channel. In an aspect, the UICC responds immediately to a first command, sent by a processor, also included within the access terminal, with an initial (or temporary) response that includes a special status word XX YY, where XX is a new status word code to uniquely identify that a response to the first command will be given asynchronously and YY is a token that the UICC may use again when processing of the first command has been completed. At this point, the communication can continue normally, with new commands, and corresponding responses, sent over the interface between the UICC and the processor. When the UICC has completed processing the first command, it responds to the current command with 9Z YY, where 9Z indicates that a current command has been successfully completed and YY indicates that a response for the previous (first) command is also available. This mechanism is similar to CAT toolkit mechanisms used to retrieve a pending proactive command. In an aspect, an access terminal polling frequency may be increased while waiting for the response to the first command, so that the processor may receive the response as soon as the UICC has completed the processing of the first command. Upon receipt of the token YY, the processor may retrieve the final (or permanent) response for the first command by using a newly-introduced command or re-using a command already defined in ETSI 102 221, such as, in an aspect, the GET RESPONSE command. In the aspect, the processor would send the GET RESPONSE command, using one of the parameters to pass the token YY value, to the UICC. The UICC may respond to the GET RESPONSE or other newly-introduced command by sending the final response for the first command to the processor.

Figure 1:
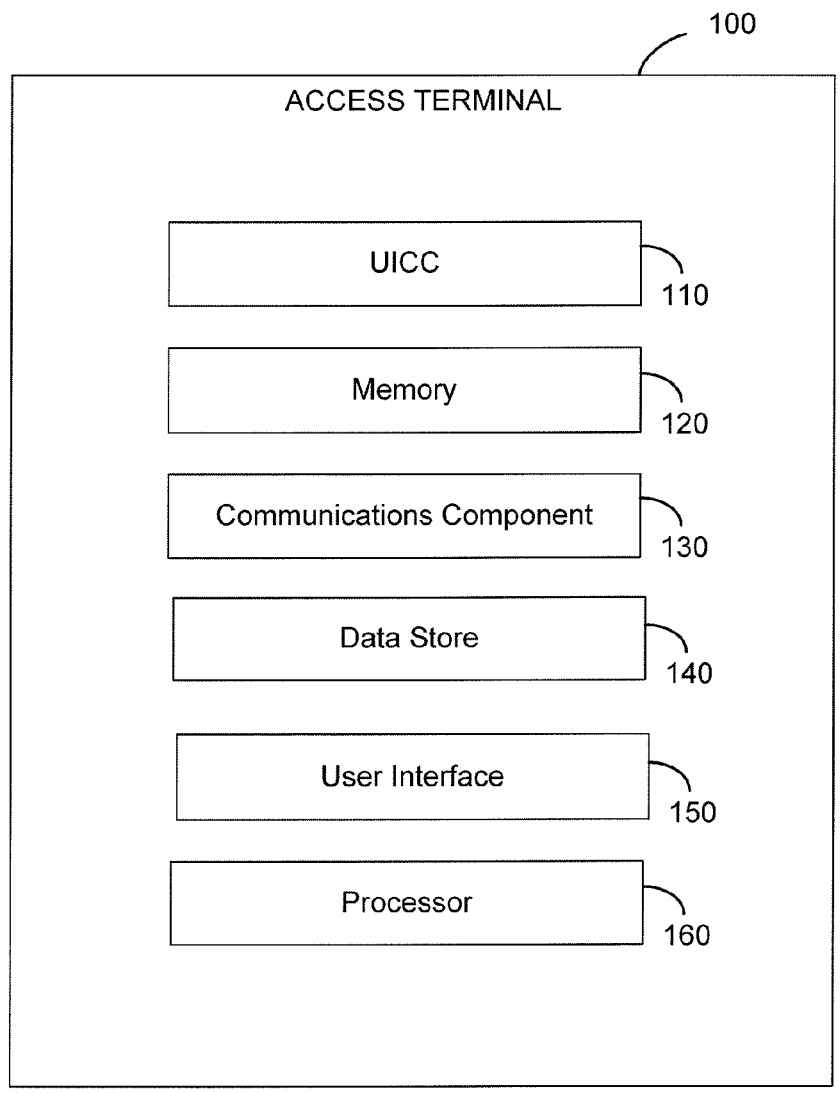
FIG. 1 is a diagram illustrating an aspect of an access terminal, including a UICC and a processor, where an interface between the UICC and the processor is configured to support asynchronous command processing by the UICC.

Referring to FIG. 1, in an aspect, access terminal 100 may include various components, including a UICC 110 and a processor 160 configured to communicate with one another over an interface, such as, for example, a communications component 130, configured to support asynchronous command processing by UICC 110.

Access terminal 100 includes UICC 110, which may be configured to provide subscription information for a wireless service, such as GSM, UMTS, or LTE, associated with the access terminal 100. UICC 110 may be referred to as a smart card or a subscriber identity module or subscriber identification module (SIM) card. In addition to storing subscription information, UICC 110 may be configured to process commands associated with other (e.g., non-telecommunications-related) applications. For example, and in an aspect, UICC 110 may be configured to process non-telecommunications related commands, such as but not limited to commands associated with banking and/or payment applications as per near field communication (NFC) standards.

Access terminal 100 includes a memory 120, configured to store data used therein and/or local versions of applications being executed by processor 160 at access terminal 100, and/or any other processing components, such as, for example, those within UICC 110. Memory 120 can include any type of memory usable by a computer, such as random access memory (RAM), read only memory (ROM), tapes, magnetic discs, optical discs, volatile memory, non-volatile memory, and any combination thereof.

Access terminal 100 includes a communications component 130, configured to establish and maintain communications with one or more entities utilizing hardware, software, and services as described herein. Communications component 130 may carry communications between components within access terminal 100. For example, communications component 130 may be configured to serve as an interface, and carry communications, between the access terminal 100 (e.g., processor 160) and UICC 110. As such, communications component 130 may include one or more buses. Communications component 130 also may carry communications between access terminal 100 and the outside world. Communications component 130 may allow communication between access terminal 100 (and/or its components) and a base station (e.g., a picocell, femtocell, macrocell, WiFi cell, or other access point) in order to provide for service from a wireless network provider. Communications component 130 may allow communication between access terminal 100, as needed by UICC 110 for processing of commands associated with non-telecommunications-related (e.g., NFC) applications, and another device (e.g., access terminal) or receiver (e.g., point-of-sale device accepting a payment) according to, for example, NFC standards. As such, communications component 130 may include transmit chain components and receive chain components associated with one or more transmitters and receivers, respectively, or one or more transceivers, operable for interfacing with external entities.

Access terminal 100 includes a data store 140, which may be any suitable combination of hardware and/or software, that provides for mass storage of information, databases, and programs employed in connection with the aspects described herein. For example, data store 140 may be a data repository for applications not currently being executed by processor 160 and/or any other processing components, such as, for example, those within UICC 110.

Access terminal 100 includes a user interface component 150, configured to receive inputs from a user of access terminal 100, and further operable to generate outputs for presentation to the user. User interface component 150 may include one or more input devices, including but not limited to a touch-sensitive display, a hard keypad, a number pad, a navigation key, a function key, a microphone, a voice recognition component, any other mechanism capable of receiving an input from a user, or any combination thereof. Further, user interface component 150 may include one or more output devices, including but not limited to a display, a speaker, a haptic feedback mechanism, a printer, any other mechanism capable of presenting an output to a user, or any combination thereof. User interface component 150 may communicate with UICC 110 to request user input needed, and for use, by the UICC 110.

Access terminal 100 includes processor 160, configured to carry out processing functions associated with access terminal 100. Such processing functions may include, for example, communicating with a network, running an operating system, executing software instructions, or any other aspect of access terminal operation. Processor 160 may include a single or multiple set of processors or multi-core processors. Moreover, processor 160 can be implemented as an integrated processing system and/or a distributed processing system.

In some cases, a UICC may be referred to as communicating with an access terminal, which may cause some confusion because the UICC is part of the access terminal. As such, it may be more accurate to indicate that a UICC may be in communication with a processor of the access terminal. However, and as described herein, the UICC 110 may interchangeably be referred to as communicating with access terminal 100 (e.g., access terminal 100 may be referred to as communicating commands to, and receiving responses from, UICC 110) and processor 160 (e.g., processor 160 may be referred to as communicating commands to, and receiving responses from, UICC 110).

Figure 2:
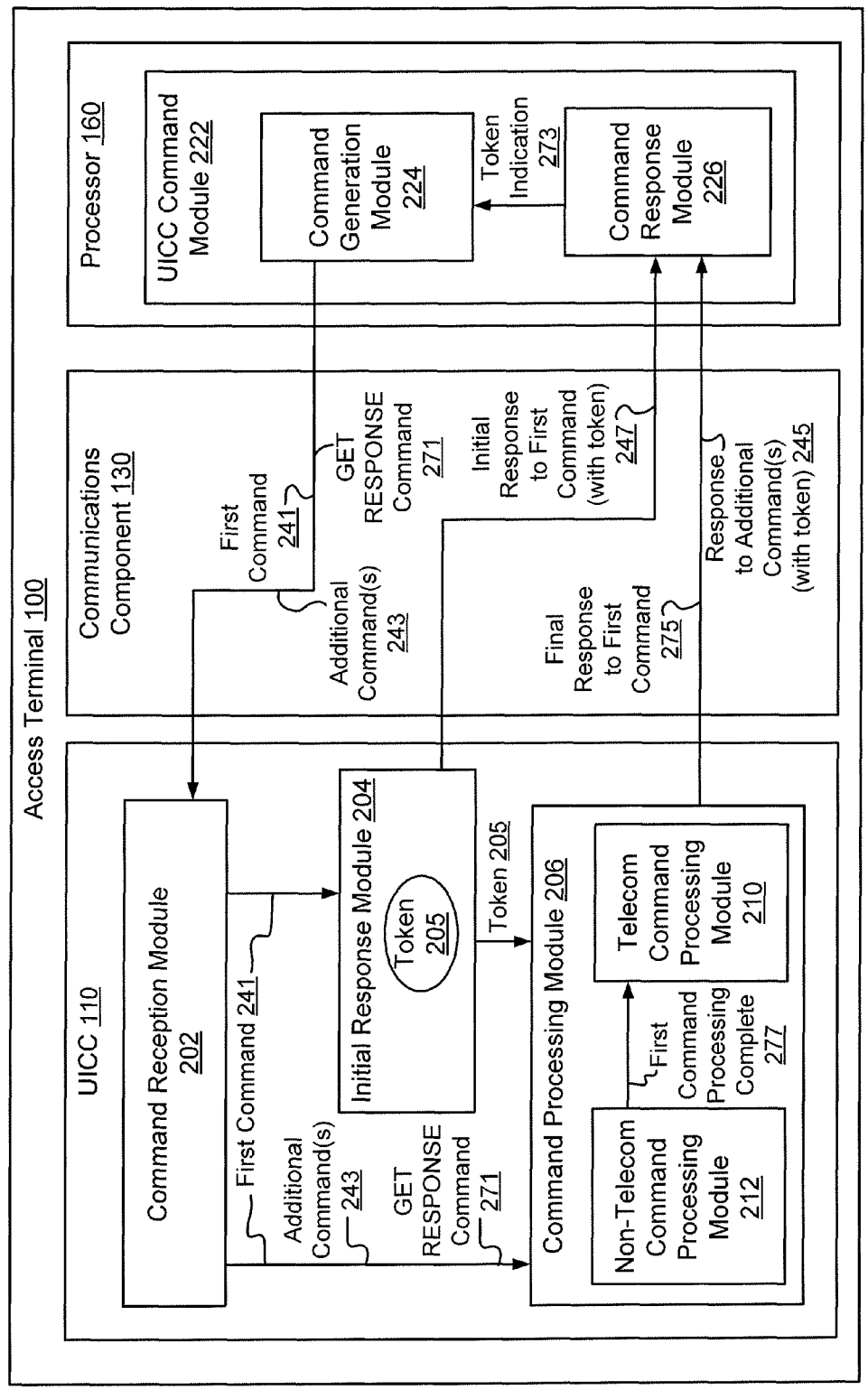
FIG. 2 is a diagram illustrating aspects of a UICC, a communications component, and a processor included within the access terminal of FIG. 1, where an interface (e.g., communications component) between the UICC and the processor is configured to support asynchronous command processing by the UICC.

Referring to FIG. 2, additional aspects of UICC 110 and processor 160, which are both included within access terminal (AT) 100 and are in communication with one another via communications component 130, are shown. In an aspect, communications component 130 may be configured to serve as an interface between the UICC 110 and the processor 160 that supports asynchronous command processing by the UICC 110.

UICC 110 includes a command reception module 202 configured to receive a first command 241 from processor 160, which includes UICC command module 222. UICC command module 222 includes command generation module 224 configured to generate, and communicate to UICC 110 via communications component 130, first command 241 and at least one additional command 243. In an aspect, first command 241 may be communicated to UICC 110 on a first logical channel. In an aspect, the first command 241 may be a complex command and/or a command associated with a non-telecommunications-related application. In an aspect, the first command 241 may be associated with a first processing time, e.g., an amount of time it takes UICC 110 to process the first command 241.

Command reception module 202 also may be configured to receive the at least one additional command 243 from the processor 160 via the communications component 130. In an aspect, the at least one additional command 243 may be communicated to UICC 110 on a second logical channel, which may be different from the first logical channel on which UICC 110 receives first command 241. In an aspect, the at least one additional command 243 may include one or more commands associated with telecommunications-related applications and/or one or more commands associated with non-telecommunications-related applications. In an aspect, each of the at least one additional command 243 may have a processing time shorter than the first processing time associated with the first command 241. In other words, UICC 110 may process each of the at least one additional command 243 in less time than it may take for UICC 110 to process the first command 241. Command reception module 202 may be configured to communicate first command 241 (which may be the same as, or similar to, first command 241 received from processor 160 depending on whether command reception module 202 is configured to perform any processing on first command 241) to an initial response module 204 and a command processing module 206. Additionally, command reception module 202 also may be configured to communicate the at least one additional command 243 (which may be the same as, or similar to, at least one additional command 243 received from processor 160 depending on whether command reception module 202 is configured to perform any processing on the at least one additional command 243) to command processing module 206.

UICC 110 includes initial response module 204 configured to receive first command 241 from command reception module 202 and send an initial response 247 to the first command to the processor 160 via the communications component 130. In an aspect, the initial response 247 includes a token 205 associated with the first command 241 as described herein, which may be, in an aspect, generated by initial response module 204.

UICC 110 includes command processing module 206 configured to receive the first command 241 and the at least one additional command 243 from command reception module 202. Command processing module 206 includes non-telecommunications command processing module 212 configured to process the first command 241 (which may be a complex, non-telecommunications-related command), until completion, and for the first processing time. Command processing module 206 includes telecommunications command processing module 210 configured to process the at least one additional command 243 (e.g., when one of the at least one additional command 243 is a telecommunications-related command), until completion and for a processing time that is shorter than the first processing time associated with the first command 241. In the example of FIG. 2 and for purposes of the present discussion, the at least one additional command 243 is assumed to be a telecommunications-related command and, as such, is processed by telecommunications command processing module 210. However, and in an aspect, one or more of the at least one additional command 243 may be a non-telecommunications-related command that may be processed by non-telecommunications command processing module 212.

In an aspect, non-telecommunications command processing module 212 may process the first command 241 at the same time (e.g., in parallel) as telecommunications command processing module 210 is processing the at least one additional command 243. In an aspect, the processing by non-telecommunications command processing module 212 and telecommunications command processing module 210 may be performed sequentially and/or otherwise. In an aspect (not shown), command processing module 206 may include only one command processing module configured to process first command 241, and halt processing of first command 241 in order to process one of the at least one additional command 243, and then, upon completion of the processing of the one of the at least one additional command 243, return to processing of first command 241.

Upon completion of processing the at least one additional command 243, command processing module 206 may be configured to generate a response 245 to each of the at least one additional command and communicate the response 245 to processor 160 via communications component 130.

Upon completion of processing the first command 241, non-telecommunications command processing module 212, and in the example of FIG. 2, communicates a first command processing complete indication 277 to telecommunications command processing module 210. Based thereon, and upon completion of a current, or next (e.g., if no command is currently being processed by telecommunications command processing module 210), one of the at least one additional command 243, telecommunications command processing module 210 may be configured to append the token 205 (which may, in an aspect, be communicated to command processing module 206 and/or telecommunications command processing module 210 by initial response module 204) to the response 245 for the current, or next, one of the at least one additional command.

The initial response 247 to the first command and the responses 245 to each of the at least one additional command may be received by processor 160 at command response module 226. Command response module 226 may be included in UICC command module 222 and configured to receive the initial response 247, which includes token 205, and store (in a data store or the like) a correlation between the first command 241 and the token 205. Upon receipt by command response module 226 of a response 245 to a current one of the additional command, which includes the token 205, the command response module 226 may be configured to determine that the token 205 relates to first command 241. Based on the determination, command response module 226 may be configured to generate and provide a token indication 273 to command generation module 224 to indicate that the response to the first command 241 is ready to be retrieved from UICC 110. In response to receiving the token indication 273, command generation module 224 may be configured to generate, and communicate to UICC 110 via communications component 130, a GET RESPONSE command 271. In an aspect, the GET RESPONSE command 271 may be communicated to UICC 110 on a first logical channel, which may be the same logical channel on which UICC receives first command 241 and a different logical channel from the second logical channel on which UICC 110 receives the at least one additional command 243. The command reception module 202 may receive the GET RESPONSE command 271 and communicate GET RESPONSE command 271 (which may be the same as, or similar to, GET RESPONSE command 271 received from processor 160 based on whether command reception module 202 is configured to perform any processing on GET RESPONSE command 271) to command processing module 206. In response to receiving the GET RESPONSE command 271 from command reception module 202, command processing module 206 and/or non-telecommunications command processing module 212 may be configured to generate, and communicate to processor 160 via communications component 130, a final response to the first command 275.

Figure 3:
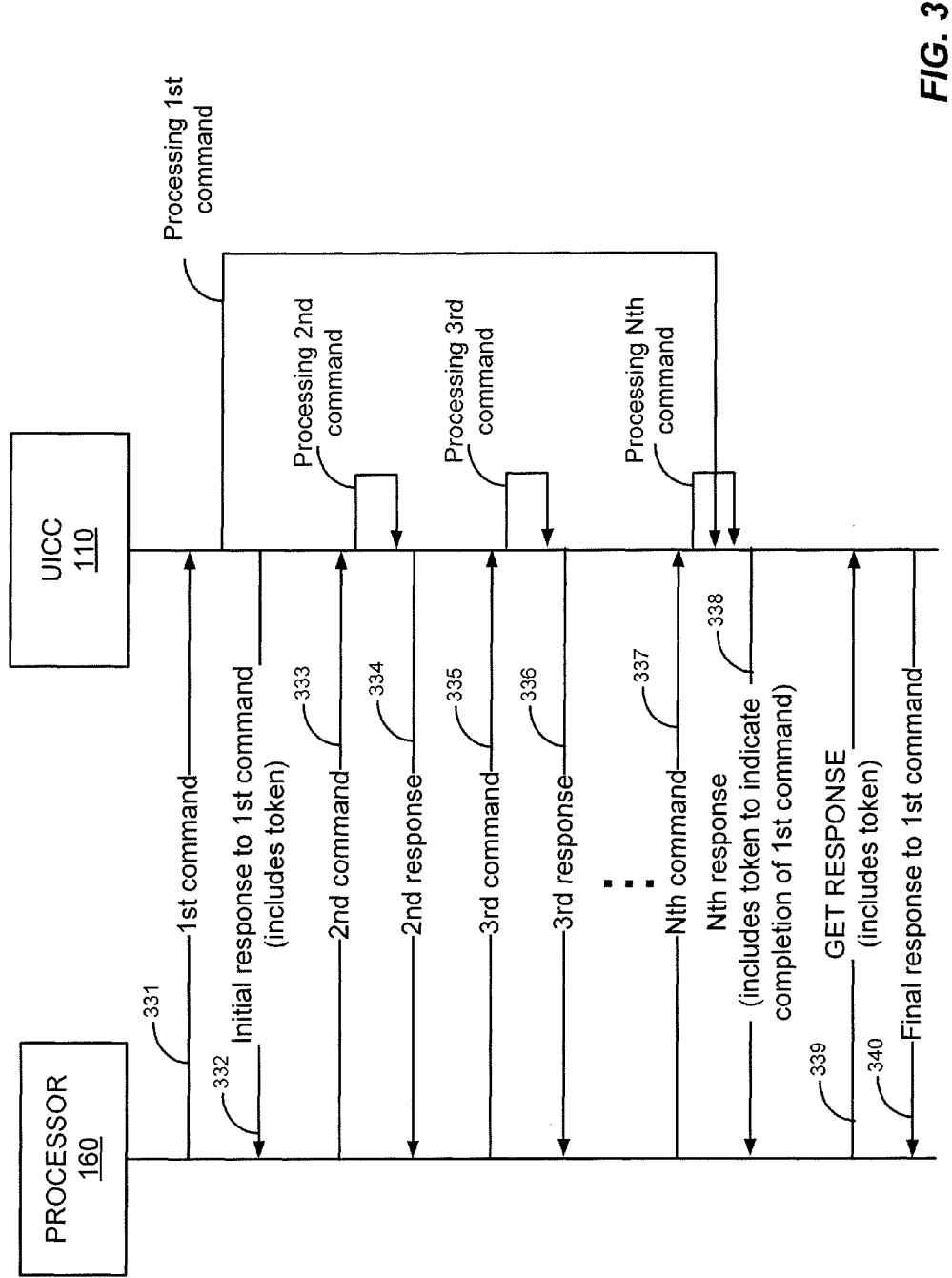
FIG. 3 is a call flow diagram illustrating aspects of communications between a UICC and a processor, included within an access terminal, where an interface between the UICC and the processor is configured to support asynchronous command processing by the UICC.

Referring to FIG. 3, in an aspect, a call flow illustrates communication between processor 160 and UICC 110, as described above with respect to FIGS. 1 and 2 over an interface (e.g., communications component 130 of FIG. 3) that supports asynchronous command processing by UICC 110.

At 331, processor 160 communicates a first command (e.g., first command 241 of FIG. 2) to UICC 110. In an aspect, the first command may be a non-telecommunications-related command, such as, for example, a command related to a banking or payment application according to NFC and/or a complex command that includes cryptographic algorithms and takes a very long time (e.g., even more than one minute) to be processed by the UICC 110. In an aspect, the first command may be sent by the processor 160 (e.g., via command generation module 224 of FIG. 2) to UICC 110 over a first logical channel associated with a first (e.g., non-telecommunications-related) application that initiated the first command. The first logical channel may be opened and bound to the first application prior to sending the first command thereon.

At 332, UICC 110 receives (e.g., at command reception module 202 of FIG. 2) the first command and responds (e.g., via initial response module 204 of FIG. 2) to the processor 160 with an initial (or temporary) response (e.g., initial response 247 of FIG. 2) to the first command. The initial response may be communicated on the first logical channel. The initial response includes a token (e.g., token 205 of FIG. 2). In one example, the response may be a special status word XX YY, where XX is a new status word code to uniquely identify that the UICC 110 will return a response to the first command at a later time (e.g., asynchronously), and YY is a token that the UICC may use again when the command is completed. In another example, the response may be some other identifier that indicates both that the response to the first command may be processed asynchronously and to uniquely identify the first command. Processing of the first command may begin at the UICC 110 (e.g., at non-telecommunications command processing module 212 within command processing module 206 of FIG. 2) upon receipt of the first command. Therefore, processor 160 has now received a response (e.g., initial response 247) to the first command request, and, as such, the upper layer may be satisfied that the UICC 110 has responded to the first command. Accordingly, the UICC 110 may no longer be blocked from receiving, processing, and responding to additional commands.

As such, and as shown at 333, 335, and 337, the processor 160 (e.g., via command generation module 224) may generate and communicate additional commands (e.g., at least one additional command 243 of FIG. 2) to UICC 110. At 334, 336, and 338, processor 160 (e.g., at command response module 226) may receive corresponding responses over the existing interface (e.g., via communications component 130) between the processor 160 and UICC 110, which may be a single physical channel. The second through Nth commands communicated to UICC 110 by the processor 160 may be telecommunications-related commands and/or non-telecommunications-related commands. In an aspect, the second through Nth commands, and corresponding responses, may be communicated on various logical channels that have been opened and bound to applications associated with the commands. In an aspect, the various logical channels used for the second through Nth commands may be the same as, or different from, the first logical channel used for the first command.

The UICC 110 (e.g., via non-telecommunications command processing module 212 of FIG. 2) may complete processing of the first command. In an aspect, and particularly if UICC 110 is a multi-threaded card, the processing of the first command may be completed during execution of an Nth command (as shown in FIG. 3). In another aspect, and in particular if the UICC 110 is a single-threaded card, the processing of the first command may be completed before an Nth command is received by the UICC 110. In any event, when, at 338, the UICC 110 responds to the Nth command (e.g., response 245 to one of the at least one additional command), which was being processed when (e.g., before, during, or after) processing for the first command was completed, the UICC 110 includes the token (e.g., token 205 of FIG. 2) used to identify first command 241 in the response to the Nth command. In an example, and one aspect, the Nth response may include 9Z YY, where 9Z indicates that a current (e.g., Nth) command has been successfully completed and a response for the first command YY is also available. In another example, and an aspect, the token may be some other identifier that indicates both that the response to the first command may be processed asynchronously and to uniquely identify the first command. In any event, the token sent with the Nth response at 338, is the same token as that sent in the initial response to the first command, at 332. In an aspect, the access terminal polling frequency may be increased while processor 160 is waiting for the response to the first command, so that the processor 160 may receive the response as soon as the UICC 110 has completed the processing of the first command.

Upon receipt of the Nth response at 338 (e.g., by command response module 226 of FIG. 2), which includes the token, the processor 160 may retrieve the final (or permanent) response for the first command. For example, and in an aspect, the processor 160 (e.g., via command generation module 224) may request the final response to the first command using a newly-introduced command or re-using a command already defined in ETSI 102 221, such as, in an aspect, the GET RESPONSE command (e.g., GET RESPONSE command 271 of FIG. 2). In the aspect, at 339, the processor 160 may communicate the GET RESPONSE command using one of the parameters to pass the token, to the UICC 110. The GET RESPONSE command may be communicated to the UICC 110 via communications component 130 and on the first logical channel. The UICC 110 may respond to the GET RESPONSE or other newly-introduced command by, at 340, sending the final response for the first command (e.g., final response to first command 275 of FIG. 2) to the processor 160 (e.g., via command response module 226) on the first logical channel.

As such, essentially two sets of requests/responses—first command (communicated at 131)/initial response to first command (communicated at 332) and GET RESPONSE command (communicated at 339)/final response to first command (communicated at 340)—are used to send a first command from processor 160 to the UICC 110 and receive a complete response to the first command from the UICC 110. Therefore, the upper layer is aware that each request (e.g., command) by the processor 160 receives a corresponding response from the UICC 110 and the UICC 110 may process the first command without the processor 160 being blocked from sending additional commands (e.g., time sensitive, telecommunications-related commands) to, and receiving responses from, the UICC 110.

In an aspect, the processing of the first command may be performed asynchronously, such that, for example, the first command is processed by the UICC 110 (e.g., via non-telecommunications command processing module 212 of FIG. 2) in the background (e.g., in parallel), on the first logical channel, while additional commands are also processed by the UICC 110 (e.g., via non-telecommunications command processing module 212 and/or telecommunications command processing module 210), on their respective logical channels. In another aspect, the UICC 110 may process the first command (on the first logical channel) during times when it is not processing other commands (on other logical channels), such that the UICC 110 may stall the processing of the first command when other commands require processing, and then return to the processing of the first command when processing of the other commands is completed.

Figure 4:
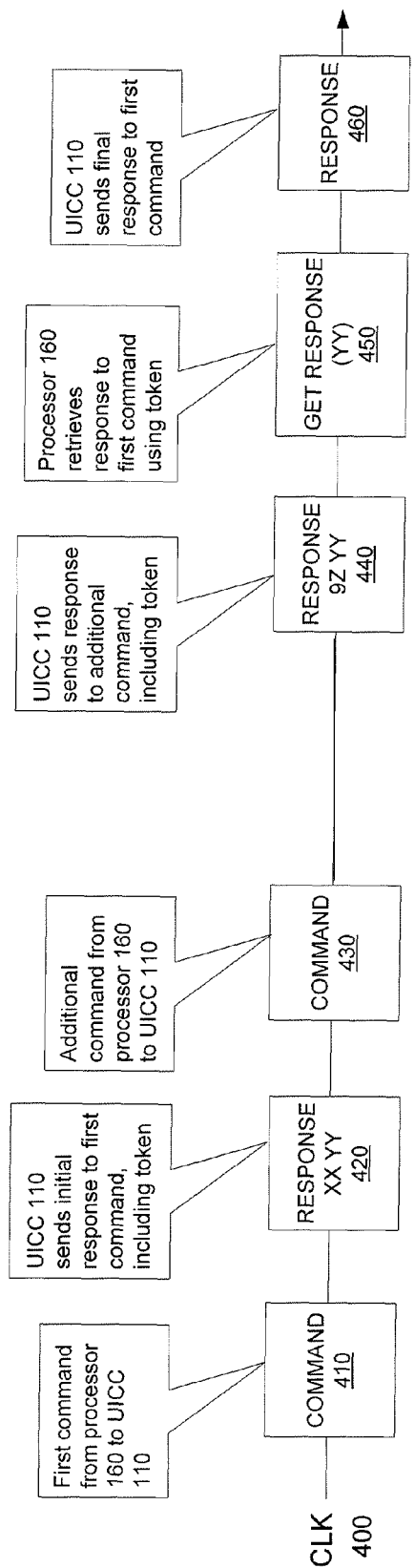
FIG. 4 is a diagram of aspects of a clock associated with an interface between a UICC and a processor configured to support asynchronous command processing by the UICC.

Referring to FIG. 4, in an aspect, a clock (CLK) 400 may be a clock associated generally with access terminal 100. In another aspect, clock 400 may be associated with processor 160. In yet another aspect, clock 400 may be a clock internal to UICC 110. In FIG. 4, the horizontal line represents time kept by CLK 400, with time increasing from left to right.

At time 410, processor 160 generates and communicates (e.g., via command generation module 224 of FIG. 2) a first command (e.g., first command 241 of FIG. 2) to the UICC 110. At 420, the UICC 110 (e.g., via initial response module 204 of FIG. 2) generates and communicates to processor 160 (e.g., via command response module 226 of FIG. 2) an initial (or temporary) response to the first command (e.g., initial response 247 of FIG. 2) upon receipt of the first command. The initial response to the first command may be communicated immediately, or at least, without unnecessary delay, upon receipt of the first command by the UICC 110. UICC 110 (e.g., at non-telecommunications command processing module 212) begins processing of the first command upon receipt. The initial response to the first command includes an indication (e.g., XX) that the first command will be processed by UICC 110 asynchronously, along with a token (e.g., YY and/or token 205 of FIG. 2) that uniquely identifies the first command.

At time 420, the initial response completes the request/response pairing such that additional commands may be communicated by the processor 160 to the UICC 110.

At time 430, processor 160 communicates at least one additional command (e.g., at least one additional command 243 of FIG. 2) to the UICC 110. Upon receipt of the additional commands, the UICC 110 (e.g., via non-telecommunications command processing module 212 and/or telecommunications command processing module 210, depending on the type of command, of FIG. 2) begins processing the additional commands while UICC 110 (e.g., via non-telecommunications command processing module 212 of FIG. 2) processes the first command. When processing of the first command is complete, and upon completion of the processing of a current additional command, the UICC 110 (e.g., via command processing module 206 of FIG. 2) generates and communicates, at time 440, to processor 160 (e.g., via command response module 226 of FIG. 2) a response (e.g., 9Z YY and/or response 245 to additional command of FIG. 2) to the processor 160. The response (e.g., 9Z YY) includes the response to the current command (e.g., 9Z) and the token (e.g., YY and/or token 205 of FIG. 2) that uniquely identifies the first command. By including the token in the response communicated at time 440, the UICC 110 is alerting the processor 160 that a final, or permanent, response to the first command is available.

At time 450, processor 160 generates and communicates to UICC 110 (e.g., via command generation module 224 of FIG. 2) a GET RESPONSE, or other, newly-introduced, command (e.g., GET RESPONSE command 271 of FIG. 2). The command includes the token (e.g., YY and/or token 205 of FIG. 2) to identify the first command.

At time 460, UICC 110 (e.g., at command reception module 202 of FIG. 2) receives the command and communicates (e.g., via command processing module 206 of FIG. 2) the final, or permanent, response to the first command (e.g., final response to first command 275 of FIG. 2).

Figure 5:
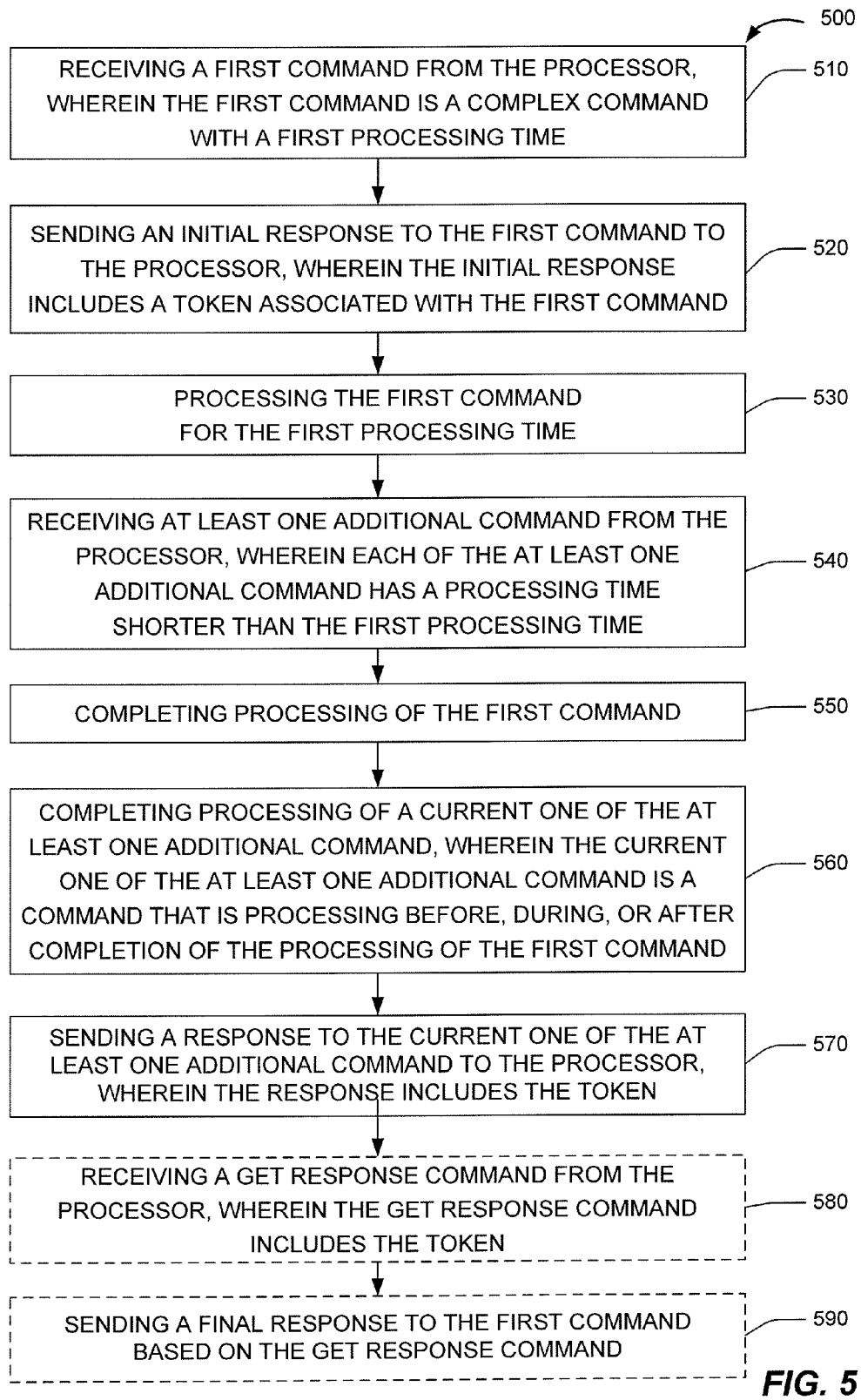
FIG. 5 is a flow chart illustrating aspects of a method for providing an interface between a UICC and a processor, included within an access terminal, that supports asynchronous command processing by the UICC.

Referring to FIG. 5, in an aspect, a method 500 for providing an interface between UICC 110 and processor 160, included in access terminal 100, that supports asynchronous command processing by UICC 110 may be performed by UICC 110 and processor 160. More particularly, aspects of method 500 may be performed by memory 120, communications component 130, data store 140, user interface component 150, and/or processor 160 of access terminal 100 (as shown in FIG. 1), command reception module 202, initial response module 204, command processing module 206, telecommunications command processing module 210, and/or non-telecommunications command processing module 212 of UICC 110 (as shown in FIG. 2), and/or UICC command module 222, command generation module 224, and/or command response module 226 of processor 160 (as shown in FIG. 2).

At 510, the method 500 includes receiving a first command from a processor, wherein the first command is a complex command with a first processing time. For example, command reception module 202 may be configured to receive first command 241, which may have been generated, and communicated to UICC 110 via communications component 130, by command generation module 224 included in processor 160. The first command 241 may be, in an aspect, a complex, cryptographic algorithm having a very long processing time (e.g., more than one minute) and/or a non-telecommunications-related command. The first command 241 may be communicated to the UICC 110 from processor 160 on a first logical channel.

At 520, the method 500 includes sending an initial response to the first command, wherein the initial response includes a token associated with the first command. For example, command reception module 202 may be configured to communicate first command 241 to initial response module 204. Initial response module 204 may be configured to generate and send an initial response 247 to processor 160 via communications component 130. The initial response 247 may include a token 205 (e.g., YY) associated with the first command 241.

At 530, the method 500 includes processing the first command for the first processing time. For example, command reception module 202 may be configured to communicate first command 241 to command processing module 206, which includes non-telecommunications command processing module 212. Non-telecommunications command processing module 212 may be configured to process first command 241 for the first processing time.

At 540, the method 500 includes receiving at least one additional command from the processor, wherein each of the at least one additional commands has a processing time shorter than the first processing time. For example, command reception module 202 may be configured to receive at least one additional command 243, which may have been generated, and communicated to UICC 110 via communications component 130, by command generation module 224 included in processor 160. Command reception module 202 may be configured to communicate the at least one additional command 243, which may be, in an aspect, the second through Nth commands of FIG. 3, to command processing module 206, which includes non-telecommunications command processing module 212 and telecommunications command processing module 210. In an aspect, the at least one additional command 243 may include one or more telecommunications-related commands, which may be processed by telecommunications command processing module 210, and/or one or more non-telecommunications-related commands, which may be processed by non-telecommunications command processing module 212. The at least one additional command 243, and corresponding responses 245 to each of the at least one additional command, may be communicated on various logical channels that have been opened and bound to applications associated with the commands. In an aspect, the various logical channels used for at least one additional command 243 may be different from the first logical channel used for the first command 241.

At 550, the method 500 includes completing processing of the first command. For example, non-telecommunications command processing module 212 may be configured to complete processing of first command 241 and, as such, generate and communicate to telecommunications command processing module 210, a first command processing complete indication 277. In an aspect, if non-telecommunications command processing module 212 is processing the current one of the at least one additional command 243, first command processing complete indication 277 may not be generated because, for example, non-telecommunications command processing module 212 would already be aware that processing of the first command 241 was completed before commending processing of the current one of the at least one additional command 243.

At 560, the method 500 includes completing processing of a current one of the at least one additional command, wherein the current one of the at least one additional command is a command that is processing before, during, or after completion of the processing of the first command. For example, non-telecommunications command processing module 212 and/or telecommunications command processing module 210 may complete processing a current one of the at least one additional command 243. In an aspect, and particularly if UICC 110 is a multi-threaded card, the processing of the first command 241 by non-telecommunications command processing module 212 may be completed during execution of a currently-pending (e.g., Nth) one of the at least one additional command 243 by non-telecommunications command processing module 212 or telecommunications command processing module 210 (as shown in FIG. 3). In another aspect, and in particular if the UICC 110 is a single-threaded card, the processing of the first command 241 by non-telecommunications command processing module 212 may be completed before a currently-pending (e.g., Nth) one of the at least one additional command 243 is received by the UICC 110. In any event, when the UICC 110 responds to an Nth one of the at least one command 243, which was being processed by non-telecommunications command processing module 212 or telecommunications command processing module 210 when (e.g., before, during, or after) processing for the first command 241 by non-telecommunications command processing module 212 was completed, the UICC 110 via command processing module 206 generates and communicates to processor 160 a response 245 to the Nth command.

In an aspect, the processing of the first command 241 may be performed asynchronously, such that, for example, the first command 241 is processed by the UICC 110 via non-telecommunications command processing module 212 in the background (e.g., in parallel), on the first logical channel, while additional commands are also processed by the UICC 110 via non-telecommunications command processing module 212 or telecommunications command processing module 210, on their respective logical channels. In another aspect, the UICC 110 via non-telecommunications command processing module 212 may process the first command 241 (on the first logical channel) during times when UICC 110 via non-telecommunications command processing module 212 or telecommunications command processing module 210, is not processing the at least one additional commands 243 (on other logical channels), such that the UICC 110 may stall the processing of the first command 241 when the at least one additional command 243 requires processing, and then return to the processing of the first command 241 when processing of the at least one additional command 243 is completed.

At 570, the method 500 includes sending a response to the current one of the at least one additional command, wherein the response includes the token (e.g., YY). For example, command processing module 206 may generate and communicate to processor 160 via communications component 130, a response 245 (e.g., Nth response of FIG. 2) for a command (e.g., the Nth command of FIG. 2) that was being processed when (e.g., before, during, or after) the first command 241 completed processing. The response 245 also serves to alert, the processor 160, via the token 205 (e.g., YY), that UICC 110 has completed processing of the first command 241.

At 580, and optionally, the method 500 includes receiving a GET RESPONSE command from the processor, wherein the GET RESPONSE command includes the token. For example, processor 160 via command response module 226 may receive the response 245, which includes token 205, and communicate a token indication 273 to command generation module 224 to indicate that the UICC 110 has completed processing of first command 241. In response, the command generation module 224 may generate and communicate to UICC 110, a GET RESPONSE command 271, or another, newly-introduced command. In an aspect, the GET RESPONSE command 271 may be communicated by processor 160 to UICC 110 via communications component 130 on the first logical channel.

At 590, and optionally, the method 500 includes sending a final response to the first command based on the GET RESPONSE command. For example, command reception module 202 may receive GET RESPONSE command 271 and communicate it to command processing module 206. In response, command processing module 206 may communicate final response to first command 275 to processor 160 via communications component 130 on the first logical channel.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. A storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for providing an interface between a Universal Interface Circuit Card (UICC) and a processor, included in an access terminal, that supports asynchronous command processing by the UICC, comprising:
   receiving a first command from the processor, wherein the first command is a complex command with a first processing time;
   sending an initial response to the first command to the processor, wherein the initial response includes a token associated with the first command;
   processing the first command for the first processing time;
   receiving at least one additional command from the processor, wherein each of the at least one additional command has a processing time shorter than the first processing time;
   completing processing of the first command;
   completing processing of a current one of the at least one additional command, wherein the current one of the at least one additional command is a command that is processing before, during, or after completion of the processing of the first command; and
   sending a response to the current one of the at least one additional command to the processor, wherein the response includes the token.

2. The method of claim 1, further comprising;
   receiving a GET RESPONSE command from the processor, wherein the GET RESPONSE command includes the token; and
   sending a final response to the first command based on the GET RESPONSE command.

3. The method of claim 1, wherein the first command is a command associated with a non-telecommunications-related application.

4. The method of claim 1, wherein the at least one additional command is a telecommunications-related command or complex command associated with a non-telecommunications-related application.

5. The method of claim 1, wherein processing the first command comprises processing the first command in parallel with processing any of the at least one additional command.

6. The method of claim 1, wherein processing the first command comprises processing the first command when the UICC is not processing any of the at least one additional command.

7. The method of claim 1, wherein receiving the first command comprises receiving the first command on a first logical channel.

8. The method of claim 7, wherein receiving the GET RESPONSE command comprises receiving the GET RESPONSE command on the first logical channel.

9. The method of claim 7, wherein receiving the at least one additional command comprises receiving the at least one additional command on at least one additional logical channel, wherein the at least one additional logical channel is distinct from the first logical channel.

10. A computer program product for providing an interface between a Universal Interface Circuit Card (UICC) and a processor, included in an access terminal, that supports asynchronous command processing by the UICC, comprising:
    a computer-readable medium comprising:
       code for causing a computer to:
          receive a first command from the processor, wherein the first command is a complex command with a first processing time;
          send an initial response to the first command to the processor, wherein the initial response includes a token associated with the first command;
          process the first command for the first processing time;
          receive at least one additional command from the processor, wherein each of the at least one additional command has a processing time shorter than the first processing time;
          complete processing of the first command;
          complete processing of a current one of the at least one additional command, wherein the current one of the at least one additional command is a command that is processing before, during, or after completion of the processing of the first command; and send a response to the current one of the at least one additional command to the processor, wherein the response includes the token.

11. An apparatus for providing an interface between a Universal Interface Circuit Card (UICC) and a processor, included in an access terminal, that supports asynchronous command processing by the UICC, comprising:
means for receiving a first command from the processor, wherein the first command is a complex command with a first processing time;
means for sending an initial response to the first command to the processor, wherein the initial response includes a token associated with the first command;
means for processing the first command for the first processing time;
means for receiving at least one additional command from the processor, wherein each of the at least one additional command has a processing time shorter than the first processing time;
means for completing processing of the first command;
means for completing processing of a current one of the at least one additional command, wherein the current one of the at least one additional command is a command that is processing before, during, or after completion of the processing of the first command; and
means for sending a response to the current one of the at least one additional command to the processor, wherein the response includes the token.

12. An apparatus for providing an interface between a Universal Interface Circuit Card (UICC) and a processor, included in an access terminal, that supports asynchronous command processing by the UICC, comprising:
at least one memory in communication with at least a communications component, a data store, a user interface, and a processor; and
a UICC comprising:
a command reception module configured to receive a first command from the processor via the communications component, wherein the first command is a complex command with a first processing time;
an initial response module configured to send an initial response to the first command to the processor via the communications component, wherein the initial response includes a token associated with the first command;
a command processing module configured to process the first command for the first processing time,
wherein the command reception module is further configured to receive at least one additional command from the processor via the communications component and each of the at least one additional command has a processing time shorter than the first processing time,
wherein the command processing module is further configured to:
complete processing of the first command,
complete processing of a current one of the at least one additional command, wherein the current one of the at least one additional command is a command that is processing before, during, or after completion of the processing of the first command, and
send a response to the current one of the at least one additional command to the processor via the communications component, wherein the response includes the token.

13. The apparatus of claim 12,
wherein the command reception module is further configured to receive a GET RESPONSE command from the processor, wherein the GET RESPONSE command includes the token, and
wherein the command processing module is further configured to send a final response to the first command based on the GET RESPONSE command.

14. The apparatus of claim 12, wherein the first command is a command associated with a non-telecommunications-related application.

15. The apparatus of claim 12, wherein the at least one additional command is a telecommunications-related command or complex command associated with a non-telecommunications-related application.

16. The apparatus of claim 12, wherein the command processing module comprises a non-telecommunications command processing module configured to process the first command and a telecommunications command processing module configured to process any of the at least one additional command in parallel with the non-telecommunications command processing module processing the at least one additional command.

17. The apparatus of claim 12, wherein the command processing module comprises a non-telecommunications command processing module and a telecommunications command processing module, wherein the non-telecommunications command processing module is configured to process the first command when the telecommunications command processing module is not processing any of the at least one additional command.

18. The apparatus of claim 12, wherein the command reception module being configured to receive the first command comprises the command reception module configured to receive the first command on a first logical channel.

19. The apparatus of claim 18, wherein the command reception module being configured to receive the GET RESPONSE command comprises the command reception module configured to receive the GET RESPONSE command on the first logical channel.

20. The apparatus of claim 18, wherein the command reception module being configured to receive the at least one additional command comprises the command reception module configured to receive the at least one additional command on at least one additional logical channel, wherein the at least one additional logical channel is distinct from the first logical channel.

* * * * *